Patented Jan. 17, 1928.

1,656,198

UNITED STATES PATENT OFFICE.

GEORGE EDWARD HEYL, OF WESTMINSTER, LONDON, ENGLAND.

FIBROUS PAINT.

No Drawing. Application filed June 29, 1926, Serial No. 119,474, and in Great Britain March 17, 1926.

This invention relates to the preparation of a fibrous paint containing especially disintegrated paper for use as a painting medium to be applied in the wet condition to a wall surface to serve as a substitute for wall paper.

Instead of paper, which is the preferred fibrous material, mechanical wood pulp, spent hops, white or brown peat or moss litter, potato pulp, sugar cane pulp, esparto grass pulp, or other similar fibrous material can be used.

Sufficiently to disintegrate paper or equivalent fibrous material so that it will not felt together or form lumps when spread by means of a liquid carrier on to a surface, it has hitherto been necessary to dead beat the paper or the like in water and to utilize the scum which arises therefrom to provide the sufficiently disintegrated material.

Now I have found that by disintegrating the material in two stages, the latter stage of which is effected in a high speed colloidal grinding machine or in a high speed impact beater, the fibrous material not only can be reduced to the required degree of fineness, but the fibrous material can be so thoroughly incorporated with the binding medium and a mineral lubricant-filler, and also with coloring matter if used, that the resulting painting medium can be very thinly spread without the fibrous material felting or balling into lumps, and consequently has great covering power.

The invention therefore consists in subjecting fibrous material, especially paper, first to an initial disintegration and subsequently to disintegration and incorporation therewith of a binding medium and a mineral lubricant-filler by high speed impact.

For a water paint or distemper the binding medium is a glue, for instance a dextrine gum, whereas for an oil paint the binding medium is constituted by the oil which constitutes the liquid carrier medium.

The two disintegrating stages may both be wet grinding processes in which the paper or the like is mixed with water and glue, oil, or a mixture of water and oil. Alternatively the first or the second or both disintegrating stages may be effected with the material in the dry condition. If both stages are dry grinding stages they may be both effected in a high speed dry impact beater, for instance by two runs through the same machine, the second run being necessary to incorporate the binding medium and filler. With a dry final disintegration stage the incorporated binding medium is glue, and the product is supplied for admixture with water for use as an under-coat paintable wall paper lining.

The mineral lubricant-filler, such as china clay, barytes, or gypsum, is added to the fibrous material prior to or during the second final stage of disintegration to promote the separation of the disintegrated fibres.

To produce a colored product a pigment or stain is added prior to or during the final disintegration.

According to one method of procedure, the paper or like fibrous material is first finely disintegrated in the dry condition and then is subsequently again disintegrated, together with 5–15% of a lubricant-filler, with glue and water, or with oil, or with both water and oil which form an emulsion, and consequently in the wet condition.

The lubricant-filler material should be added dry to the dry ground fibrous material before the wet grinding otherwise the resulting mixture tends to be lumpy.

The initial dry grinding is preferably effected in a high speed rotary dry impact or beater mill, and the subsequent wet grinding is carried out in a high speed colloidal beater mill.

The resulting smooth liquid mixture is applied wet to a wall surface and on drying serves as a wall paper substitute or wall paper lining.

In another method of procedure, the paper or like fibrous material is beaten up with water to a state of extreme fineness in an ordinary paper pulp beater whilst the glue, the mineral filler and the pigment are mixed therewith during or subsequently to the beating and the mixture is subsequently beaten and intimately mixed in a wet colloidal beater machine. The fibrous material constitutes about one per cent of the solid constituents of the resulting water paint.

The subsequent beating in the wet colloidal machine obviates the initial beating being carried to the state in which the material is dead beat, whereby the period of treatment is considerably reduced.

In an alternative but somewhat less convenient method of procedure, the paper or other fibrous material is first beaten wet in water to a state of extreme fineness in an ordinary paper pulp beater. Then the bulk of the moisture is expressed in a press from the beaten fibrous material and the cake is dried. Finally the cake is broken up to a state of powder in a high speed dry beater machine, for example to a state of fineness such as to pass through a screen, the bars of which are from 1/16 inch to 1/80 inch apart. The mineral lubricant-filler and the glue are added prior to the final dry beating and may be added during or prior to the initial wet beating. The product is a dry product for admixture with water as above set forth.

The initial beating of the material can be effected in oil, in which case the oil is not expressed, no glue is added and the second stage of the disintegration is effected in a high speed wet beater colloidal mill. The product is a wet product. However if the initial stage is effected in a mixture of water and sufficient oil to serve as a carrier medium, the water may be dried out of the product of the initial beating, and the second stage of disintegration is then effected in a high speed wet beater.

Linseed oil, oxidized or boiled, or an enamel oil containing copal or other resin, may be employed in the initial beating, in which case the resulting material is made water-resisting.

A paint containing disintegrated fibrous material prepared as above described, can be used for surfacing cardboard, in which case colored fibrous surfaces, either water-resisting or not, are produced.

The fibrous material may be fireproofed or mineralized either before or after dry grinding and before wet grinding, by impregnating the material with a calcium hydrate solution and draining off the liquid and passing a stream of $CO_2$ therethrough which converts the calcium hydrate into insoluble calcium carbonate, impregnating the pores of the material.

When an emulsion of oil and water is used as the liquid medium, any of the usual emulsifying agents, such as aluminium hydroxide or zinc salts, are employed to retain the oil and water in the emulsified condition.

By the addition of a small proportion, up to 15%, of oil or turpentine or Venetian turpentine, or a mixture of oil and turpentine or Venetian turpentine to the water used in the wet process, together with an emulsifying agent, surfaces painted with a water paint produced by the above described process are rendered water-resistant.

I claim:

1. A method of producing finely disintegrated fibrous paint material, especially a mixture containing finely disintegrated paper, consisting in subjecting said material first to an initial disintegration and subsequently to disintegration and incorporation therewith of a binding medium and a mineral lubricant-filler by high speed impact until the fibres of said material are so broken and said broken fibres are so separated by said mineral lubricant-filler as to produce a finely spreading non-felting mixture.

2. A method of producing finely disintegrated fibrous paint material, especially a mixture containing finely disintegrated paper, consisting in dry grinding said material by high speed impact, and subsequently wet grinding and incorporating with said dry ground material a binding medium and a mineral lubricant-filler by high speed impact until the fibres of said material are so broken and said broken fibres are so separated by said mineral lubricant-filler as to produce a finely spreading non-felting mixture.

3. A method of producing finely disintegrated fibrous paint material, especially a mixture containing finely disintegrated paper, consisting in subjecting said material first to an initial disintegration and subsequently to disintegration and incorporation therewith of a binding medium, a mineral lubricant-filler and coloring matter by high speed impact until the fibres of said material are so broken and said broken fibres are so separated by said mineral lubricant-filler as to produce a finely spreading non-felting mixture.

4. A method of producing finely disintegrated fibrous paint material, especially a mixture containing finely disintegrated paper, consisting in dry grinding said material by high speed impact, and subsequently wet grinding and incorporating with said dry ground material a binding medium, a mineral lubricant-filler and coloring matter by high speed impact until the fibres of said material are so broken and said broken fibres are so separated by said mineral lubricant-filler as to produce a finely spreading non-felting mixture.

In testimony whereof I have signed my name to this specification.

GEORGE EDWARD HEYL.